United States Patent
Fuchs

(10) Patent No.: US 10,969,234 B2
(45) Date of Patent: Apr. 6, 2021

(54) MULTIMODAL VEHICLE ROUTING SYSTEM AND METHOD WITH VEHICLE PARKING

(71) Applicant: Gil Emanuel Fuchs, Nes Tziona (IL)

(72) Inventor: Gil Emanuel Fuchs, Nes Tziona (IL)

( * ) Notice: Subject to any disclaimer, the term of this patent is extended or adjusted under 35 U.S.C. 154(b) by 0 days.

(21) Appl. No.: 16/797,708

(22) Filed: Feb. 21, 2020

(65) Prior Publication Data
US 2020/0191587 A1 Jun. 18, 2020

Related U.S. Application Data

(63) Continuation of application No. PCT/US2018/049277, filed on Aug. 31, 2018.

(60) Provisional application No. 62/553,721, filed on Sep. 1, 2017.

(51) Int. Cl.
*G01C 21/34* (2006.01)
*G06Q 10/04* (2012.01)
*G06Q 30/02* (2012.01)

(52) U.S. Cl.
CPC ..... *G01C 21/3461* (2013.01); *G01C 21/3446* (2013.01); *G01C 21/3492* (2013.01); *G06Q 10/047* (2013.01); *G06Q 30/0283* (2013.01)

(58) Field of Classification Search
CPC ............ G01C 21/3461; G01C 21/3492; G01C 21/3446; G06Q 30/0283; G06Q 10/047
See application file for complete search history.

(56) References Cited

U.S. PATENT DOCUMENTS

| | | |
|---|---|---|
| 5,893,081 A | 4/1999 | Poppen |
| 6,826,472 B1 | 11/2004 | Kamei et al. |
| 8,847,791 B1 | 9/2014 | Urbach |
| 8,949,028 B1 | 2/2015 | Klampfl et al. |
| 9,857,193 B2 | 1/2018 | Vulcano et al. |
| 9,958,280 B2 | 5/2018 | Scofield et al. |
| 10,156,848 B1 * | 12/2018 | Konrardy ............... G01C 21/34 |
| 2005/0107951 A1 | 5/2005 | Brulle-Drews et al. |
| 2007/0263590 A1 | 11/2007 | Abileah et al. |
| 2012/0004841 A1 | 1/2012 | Schunder |

(Continued)

FOREIGN PATENT DOCUMENTS

WO 2016026865 A1 2/2016

OTHER PUBLICATIONS

International Search Report and Written Opinion dated Dec. 6, 2018, in connection with PCT/US18/49277, filed Aug. 31, 2018.

*Primary Examiner* — Hunter B Lonsberry
*Assistant Examiner* — Mathew Franklin Gordon
(74) *Attorney, Agent, or Firm* — Downs Rachlin Martin PLLC

(57) ABSTRACT

A system and method is provided that creates a multimodal transportation routing that originates using a road-based vehicle which then requires parking. Parking is not necessarily near the destination, but is determined based on user preferences and specification of the relative importance of speed of travel and monetary cost and/or safety. Other factors can also influence the route selection and comprise: parking availability, user preference for parking type, vehicle restrictions, maximum distance a user is willing to walk or bike and what types of public transportation a user is willing to use. Monetary factors include: fuel costs, parking costs, tolls, and public transportation costs.

13 Claims, 3 Drawing Sheets

(56) References Cited

U.S. PATENT DOCUMENTS

| | | |
|---|---|---|
| 2012/0158299 A1 | 6/2012 | Cerecke et al. |
| 2012/0310520 A1 | 12/2012 | Kanno et al. |
| 2013/0046456 A1* | 2/2013 | Scofield ............. G01C 21/3453 |
| | | 701/117 |
| 2014/0278105 A1 | 9/2014 | Canfield |
| 2014/0350853 A1* | 11/2014 | Proux .............. G08G 1/096741 |
| | | 701/533 |
| 2014/0350978 A1 | 11/2014 | Li |
| 2014/0350979 A1 | 11/2014 | Paetzold |
| 2017/0059337 A1 | 3/2017 | Barker et al. |
| 2017/0176205 A1* | 6/2017 | Jones ................... G01C 21/367 |
| 2017/0356751 A1* | 12/2017 | Iagnemma ......... G01C 21/3691 |
| 2018/0313661 A1* | 11/2018 | Eyster ................ G01C 21/3617 |
| 2020/0103242 A1* | 4/2020 | Chachra .................. G06F 16/29 |

\* cited by examiner

MULTIMODAL VEHICLE ROUTING SYSTEM AND METHOD WITH VEHICLE PARKING

RELATED APPLICATION DATA

This application is a continuation of PCT/US18/49277, filed Aug. 31, 2018, and titled Multimodal Vehicle Routing System and Method with Vehicle Parking; which application claims the benefit of priority of U.S. Provisional Patent Application Ser. No. 62/553,721, filed Sep. 1, 2017, and titled Device, System and Method of Parking-Based Routing and Guidance Combining Private with Public Routing. Each of these applications is incorporated by reference herein in its entirety.

FIELD OF THE INVENTION

The present invention generally relates to the field of systems and methods for vehicle navigation and routing. In particular, the present invention is directed to a multimodal vehicle routing system and method with vehicle parking.

BACKGROUND

Basic methodologies for vehicle routing are well understood and documented in the art. A user can enter an origin and a destination into an application which either resides locally on a device or is a web application or a combination of the two. In one system type, a route is calculated based on the least cost of travel, with what constitutes the cost of travel being fixed in the system or specified by the users. Typical costs in such systems are distance to be traveled, duration of travel, which in turn could be a function of speed limit and traffic. Other user preferences can be taken into account as well, such as, for example, a driver's desire to not drive on limited access highways. Existing systems also include algorithms for optimizing routes for multiple stops.

Systems and techniques for navigation to parking areas and also identification of available parking are known. Newer parking structures may have optical or other sensors to detect where parking is available. Much of the time, this information is readily available on the Internet. GPS applications of in-car navigation devices and on smart phones can notify users when individual vehicles move in and out of parking structures. Optical or other forms of sensors can identify when street parking is being used.

Likewise multimodal or inter-modal transportation routing is also known in the art. In vehicle navigation, a road network is typically represented by what is called a multi-graph consisting of intersections (nodes) and road segments (edges). Both the nodes and edges have associated costs of travel. Because one-way roads exist, all edges are directed. There may exist multiple edges between two nodes. For example, there may exist parallel roads without side streets that diverge and join again. Therefore, the road network is represented as a multi-graph, which can have multiple directed edges between the same two nodes. The cost of travel over a particular route is the summation of the cost of travel over all the road segments and through all the intersections that make up that route. An optimal route is the route that has the minimum cost for a given starting point and destination. In the case of a multimodal transportation network database, the multi-graph may have edges that relate to a mass transit system, such as railroad, buses and subways, and also pedestrian and bike routes, among other routes of transportation.

Several road restrictions occur that can prohibit or make travel undesirable using certain maneuvers. For example, a left-hand turn may be prohibited at a certain intersection when traveling in a certain direction. One way to look at prohibited maneuvers is to consider them to have infinite cost. When running a routing algorithm, if a left-hand turn was necessary for a given route and that left-hand turn was prohibited (had an infinite cost), then that route would never be chosen as optimal as its cost would exceed any other route that had no restrictions with infinite cost.

SUMMARY OF THE DISCLOSURE

Embodiments of the present invention provide systems and methods for multimodal navigation including routing that factors in one or more of: parking availability along a proposed vehicle route, which may be irrespective of ultimate destination unique weighting that balances the desire to get to a destination quickly versus the monetary cost of the route (parking fees, fuel costs, tolls, public transportation fares) and the relative safety of the route.

In another embodiment a method and system is provided for determining a routing to a destination using one or more means of transportation with the first leg of a journey using a motor vehicle that then is parked prior to or during the arrival at the destination. This task is completed utilizing a navigation system or app on a computing device. A user enters information on the origin of the trip, the destination, and optionally the amount of money to spend to make the trip and the time to start the trip. Note the that parking does not necessarily have to be near the destination and that the parking of the car could be a function of proximity to public transportation or a bicycle route, for example, and be closer to the starting point than to the destination. Also note that depending on the availability of parking and the price of parking and the user preference that are loaded into a system, the system may recommend parking nearer or farther from the destination, but nearer to a public transportation center.

In another embodiment, determination of routes including parking may comprise determining, using a route-finding algorithm executed on the processor, an initial route to the destination in compliance with saved user preferences and exclusions; identifying available parking at destination within set cost parameters and returning available parking meeting set cost parameters; if no available parking at destination within cost parameters, then identify parking along first initial route within secondary cost parameters and returning; if no available parking along initial route, then conduct parking search for available tertiary parking locations meeting corresponding cost parameters; and determining, using a route-finding algorithm executed on the processor, alternative vehicle routes to identified tertiary parking locations and non-vehicle routes to the destination from the identified tertiary parking locations and returning to the user alternative vehicle routes and non-vehicle routes meeting set cost parameters. Route-finding algorithms employed may comprise known route-finding algorithms such as the Dijkstra algorithm or A* algorithm.

In yet another embodiment, a method may be carried out by a computer for determining a multimodal transportation routing that originates using a road-based vehicle which then requires parking. The method includes generating a plurality of candidate routes from an origin to a destination, each candidate route comprising two or more legs and a parking location connecting two of the at least two legs, each of the at least two legs being represented by an edge and the parking location being represented as a node; for each candidate route, assigning a respective travel cost to each of the edges and the node, wherein the travel cost is assigned in a unit of measure that equates a plurality of factors into a single index; for each candidate route, calculating a total routing cost based on the respective travel costs of the edges and the node; and selecting an optimal route from the plurality of candidate routes based on the respective total routing costs.

Other embodiments of this invention incorporate one or more of the availability of parking, the safety of the parking, the safety of walking or biking from parking to the next leg of the journey and the cost of parking into the travel cost model used for picking an optimal route. User preferences in the travel costs for maximum walking time or maximum bike travel time also may be incorporated.

When biking is planned as a method of transportation, it may be necessary to be able to carry the bike on alternate modes of transportation such as buses or trains. In some embodiments of this invention, this information is in one or more of the data stores.

Some embodiments of the invention have specific travel costs associated with specific types of vehicles, or special needs of the traveler.

Weather can be a factor for walking, driving, and cycling and in embodiments of the invention, weather is retrieved and/or input and effects the weighting of the cost model.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
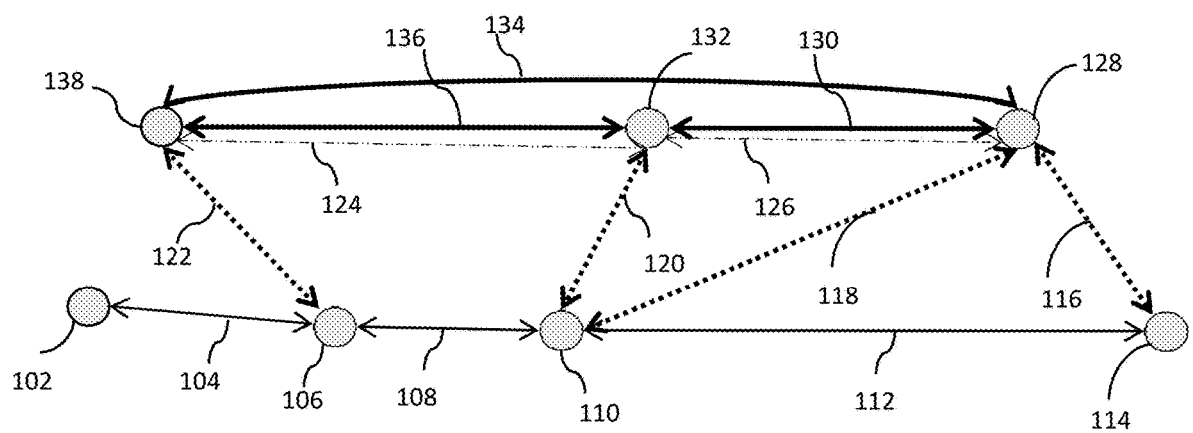
FIG. 1 is a schematic representation of a multimodal transportation network.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

With the advent of the "connected" world, it is now possible to get crowd sourced near real-time information concerning traffic and driving conditions. Real-time information can be incorporated into routing models as a dynamic cost. For example, by looking at historic information, one can find that the speed of traffic during rush hour is much slower than the speed of traffic in the middle of the night or at the same time during a weekend.

When determining a faster route for a longer trip, say from one city to the next, the routing algorithm employed must determine what speed information to use. If real-time data is available for road segments near the present location of the vehicle being routed, then the real-time data may be the best information. For segments that will not be traversed for some time, then historic speed for the given time of day and day of the week can be used, correlated to when the vehicle is expected to be at the location of the segment in question. As a vehicle is progressing along a route, if the navigation system is so equipped, then the route should be recalculated periodically from the current location taking into account the latest dynamic information and/or historic information. User preference can typically be set as to when and where to use real-time, historic or static speeds.

More complicated cost models can be used that incorporate more than speed of travel. The concept of a cost multiplier can be introduced so that other factors can be weighted to effect the route. In the example where a driver wishes to limit driving on limited access highways, limited access highways could be assigned a much higher cost multiplier such that when summation of the costs are computed for potential routes, a route with a limited access highway would not be optimal unless there was no other choice.

A driver may not want the fastest route, but a more scenic route. In this example (scenic drive), provided there was attribution in the road database that designated scenic road segments, the driver could select how long a time he/she desired to make the trip to the destination. A rule could be made that at least one scenic segment must be traversed along a route from the origin to the destination. A second rule could be made that as many scenic segments as possible be traversed within the given time frame allotted for the trip. Many standard routing algorithms are capable of this calculation. Examples of basic route-finding algorithms which may be used in embodiments of the present invention include the Dijkstra algorithm and A* algorithm. Examples of implementations of such routing algorithms are shown, for example in U.S. Pat. Nos. 6,826,472B1 and 5,893,081A, entitled, "Method and apparatus to generate driving guides" and "Using multiple levels of costs for a pathfinding computation", respectively, each of which are incorporated by reference herein in their entirety.

GLOSSARY

Node: A point in a network or graph where two or more edges come together. There is a cost associated with traversing a node from one edge to another. There may also be restrictions associated with the node. For example, a node could be an intersection between two road segments (edges). The rules could be, for example, no left turn from segment A to segment B in a north-bound direction. Cost could be: on average, it takes 1 minute to get through this node north-bound on segment B. A node could also be more complex, such as a train station. A travel cost associated for a train station node could include walking time from the parking lot to train platform C. Another cost example would be a function of when you arrive at the station and when the next train in the direction of your destination leaves.

Edge: A means to traverse a network from one node to another. An edge could be a road segment between two intersections. An edge could be the rail line between two stations. An edge could be the straight line flight pattern for a helicopter traveling from one heliport to an airport.

Cost of Travel: A unit of measure which equates a variety of factors into a single index that defines the expense of traversing an edge or a node. In an illustrative example, the cost for turning left at a node from edge A to edge B could be infinite, if the left turn was prohibited. In another example, for an edge, a cost could be the travel time to traverse the segment in a given direction. This cost could vary based on time of day, time of week or traffic counts among other things. The total cost of a trip is the summation of the cost for traversing all edges and nodes in the route. Cost of travel could be unitless or expressed, for example in time equivalents. For example, a user could specify that 1 minute waiting is equivalent to 1 mile in distance or $5 in train fares.

Data Store: Any database, listing, parameters that are input by a user, list, or geographic information system that contains information needed for optimal routing and is accessible by the processors and algorithms that calculate the optimal routing. Access can be via a hard connection between the processor or any wireless means available. Typically, queried information is transported using a file format such as Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein.

Monetary Cost: The cost in dollars associated with traversing a network by a particular route, for example, a fare for public transportation or taxi, the fee for parking or the cost of fuel for a vehicle.

Transportation Network: A system of roads, streets, paths, sidewalks, trails, waterways or other ways that a vehicle or pedestrian travels along. A transportation network can be subdivided by the type of vehicle or pedestrian that it is intended to be used for. For example, roads and streets may be used by cars, trucks and buses. Trails and sidewalks may be used by pedestrians and perhaps bicycles. Trains use railroad tracks. Transportation networks are generally stored in a geographic information system (GIS) that documents the location and interaction of various components of the transportation network. Attribution is also associated with the various components of the network.

Multimodal or Inter-modal Transportation Network: A transportation network that combines several modes of transportation and has connectivity to each. For example you may drive a car to near a train station, park, walk to the train station, and take the train. Connections between all of these means of transportation are contained in a single database or distributed database. How these forms of transportation interact with one another is held in a table which registers the "exchange rate" between the components.

Attribute: An attribute associated with a transportation network includes any piece of information that can be related to a spatially referenced element or component of the transportation network. Examples are such things as speed limits, number of lanes, connections between components, or type of vehicle that can traverse the component. Attribute, in addition to being spatially referenced may have a temporal (time) component expressed as, for example, time of day, time of week, or time of year. An example of this is the speed limit in a school zone.

User Preferences: Criteria for routing that the user specifies either before or during the routing process. A user could specify, for example: stay off of limited access highways; any park in lots that are covered; don't require walking more than 1 mile.

Mobile Device: Handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device can be a computing device, personal computer (PC), multiprocessor system, microprocessor-based or programmable consumer electronic device, network PC, diagnostics equipment, a system operated by a vehicle manufacturer or service technician, and the like, and is not limited to portable devices. The mobile device can receive and process data in any of a variety of data formats. The data format may include or be configured to operate with any programming format, protocol, or language including, but not limited to, JavaScript, C++, iOS, Android, etc.

In FIG. 1, a sample multimodal transportation network is represented schematically. Nodes 102, 106, 110, 114, 128, 132 and 138 are represented by circles and are where one or more edges (transportation segments) intersect. In this example, node 102 is the origination point of a desired route and node 114 is the destination. A travel mode by train is represented by edges 130, 136, and 134. Edge 134 represents an express train which doesn't stop at node 132. Nodes 128, 132, 138 represent train stations. In some embodiments, walking from the parking structure to a transportation station would be represented by an edge designated for walking. In other embodiments (as depicted in FIG. 1), walking from parking to the train station would be modeled by increasing the travel cost associated with traveling through the train station node.

Edges 124 and 126 represent travel segments via bicycle. Similarly, edges 116, 118, 120, and 122 are segments that can be traversed by pedestrians. Nodes 106 and 110 represent parking structures.

In this simplified example, a vehicle that plans on leaving a starting point node 102 to travel to destination node 114 has numerous options for travel. In this example, it is a condition that a vehicle be used to start the journey (the user's private car), then travel is required from the origination node.

Numerous routes are possible with the simple network of FIG. 1. In order to pick the optimal route, the route cost for each edge that makes up a potential route must be determined. This information will come from one or more data stores and could be modified by users' preferences and exclusions and feeds of information from a variety of sources that would affect speed, parking availability and safety.

Figure 2:
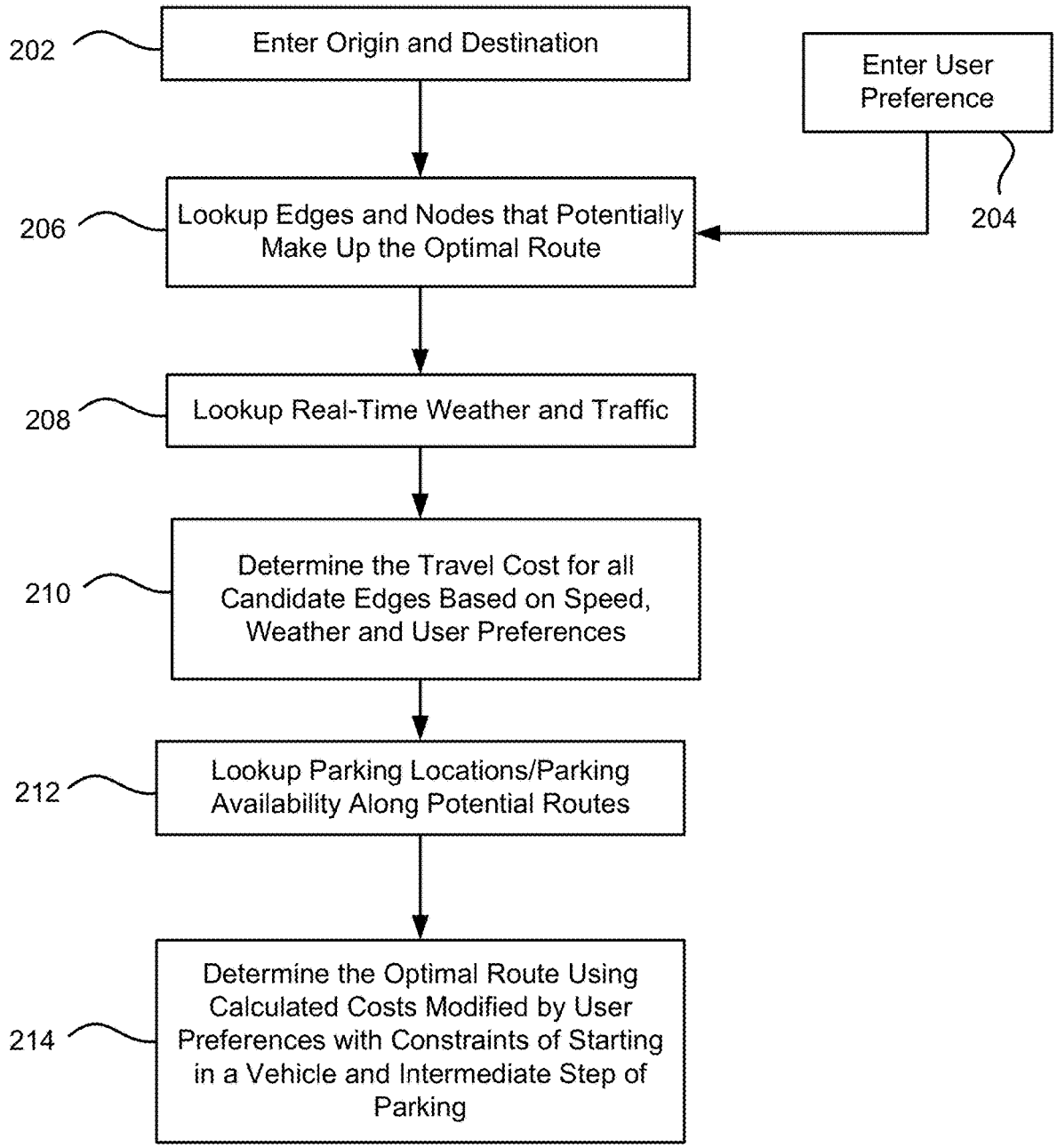
FIG. 2 is a flow chart of an embodiment of a routing method requiring parking.

In an embodiment, FIG. 2 depicts a flow chart of steps to determine a route from an origin to a destination, starting with a vehicle that needs to be parked and ending at a destination.

It should be noted that the routing system could be configured in a portable navigation device, a generic mobile device such as a mobile phone or tablet, or virtually any type of computer that is either stand alone or that has access to some type of network. Information needed for the routing can be either stored in memory on a device or acquired all or in part via a network to other data stores or real-time information feeds. Sources of real-time information can include weather, traffic, parking and general map updates.

A user of the navigation system enters information via any type of input device that can be controlled by the processor or processors that implement the routing algorithm and method. These could include touch screens, keyboards, mouse, voice command or any other device.

In FIG. 2, a user enters an Origin and a Destination to the proposed route 202. A preferred time and date for the route to commence can also be entered if the route is not to start immediately. Prior to the route calculation, a user needs to also have entered User Preferences 204. These could have been entered earlier and stored in computer memory previously.

Table 1 below lists some examples of what user preferences or exclusions might be. A preference would reduce or increase the travel cost of an edge by either a set amount or user specified amount. A parking exclusion would prohibit parking based at locations that meet user specified criteria. Table 1 should not be construed as an exhaustive list for routing preferences, but rather examples of preferences or exclusions that may influence routes that require parking along the way and are multimodal.

TABLE 1

Sample User Preferences or Exclusions

| | |
|---|---|
| Parking | Type of Parking, e.g., Parking Structure, Street Parking, Valet |
| | Monetary Cost of Parking, e.g., Hourly, Daily, Weekly (and maximums willing to pay, if any) |
| | Safety Threshold (if there is a lot of theft or vandalism at the parking area, how much of this is the user willing to put up with?) |
| | Ease of ingress or egress. For example, is a major sporting event occurring nearby when the vehicle is to be parked? |
| Monetary Cost of the Trip | Total Maximum Cost, What to include in cost calculation: fuel, parking fees, public transportation fees |
| Weighting Function | What is the relative worth of Time vs. Money? Would the user prefer to spend less money and arrive later? 10 minutes later? 20 minutes later? How much is the user willing to spend before willing to take more time? |
| | What is the relative importance of safety? Is the user willing to trade off some safety factor to get to the destination faster? |
| | What is the relative importance of the availability of the various data stores or available parking information? Does user wish to park in parking areas with real-time availability information only? If parking information for various areas are statistically not very accurate, does user want to avoid them? |
| Vehicle Type | Emergency, Handicap, Carpool, High Clearance, Weight Restriction, Commercial, Compact (this will impact the type of parking) |
| Walking | Maximum Distance the user is willing to walk Safety Threshold (how bad of crime area do you want to walk through?) |
| Biking | Maximum Distance the user is willing to bike Safety Threshold (how bad of crime area do you want to bike through?) |
| Weather | Do you want to walk, bike or drive in the rain and snow? |
| Bike Transport Needed | Do you need public transportation to be able to take your bike so you can ride it after? Are you willing to use a City Bike and is there pickup/drop-off stations |
| Cabs | Commercial, Lyft, Uber - OK? |
| Public Transportation | Buses, Trains, Express only - OK? |
| Maximum Number of Modes of Transportation | The user may have baggage and every time that the bags have to be moved from one mode to the next makes it more difficult for the user. |

Referring again to FIG. 2, the next step is to look up information about nodes and edges that potentially make up the route 206. This look up could come from various data stores that are on the device or devices housing the processor or could be from data stores that are housed on entirely different systems that are accessed by wired or wireless communication, via the internet or intranet.

If the system the route calculation is processing on, has some form of communication with real-time feeds for traffic, weather and other factors that may influence the route, the information is acquired for the potential edges that might make up the route 208. Please note that the step looking for traffic and other real-time feeds might happen later in the process after some preliminary routes have been determined in order to limit how much information must be acquired.

Once all the information is gathered, then the travel cost for the potential edges that may make up the route can be assigned 210.

Step 212 involves finding parking that is along or near potential routes. Parking information could come in the form of:

Physical Parking—one or more data stores that contain information about locations and quantity of parking places that exist. This could be a listing of parking structures and how many spaces they have or it could be the location of street-side parking.

Parking availability—Information provided from crowd sources, or from sensors for example, SmartParking® (Smartparking.com).

Historical Parking—Compiled statistics about the historical availability of parking at certain times of day or time of week, during events, etc. for various locations.

There can be a variety of user's preferences regarding parking and availability. For example, the user may not wish to use parking information from sensors, as it may be relatively new to an area and there may be insufficient sensors to adequately predict parking availability. A parking area may be excluded or rated higher, based on user input. Prior to performing the routing computation, the parking not acceptable to the user, is excluded from consideration.

In some embodiments, the user may also enter the duration of parking. If the information is available for major events that are happening nearby or it is known that there are numerous vehicles entering or exiting a parking structure when the driver wants to enter or exit the structure, the algorithm may choose another parking area to avoid congestion.

Using the best available parking information and the parking information that is acceptable to the user, a list of possible parking along potential routes is compiled.

An optimal route is calculated 214 based on all the available information. The route calculation is set up such that the route starts in a vehicle and provides for parking at one of the possible locations at an intermediate stop. The optimal routes will be a function of the cost of all the edges that are traversed to arrive at the destination.

If there is no route available that has parking associated with it, if this is a function of user-specified exclusions or preferences, then the user would be asked by the user interface to lighten the restrictions.

In an embodiment of the invention, once a driver initiates the route, the routing algorithm would be periodically re-run and the various data-stores or online feeds re-queried for the latest information and if the cost of the optimal route has increased or other routes not chosen have their cost decreased, then the system may alter the route to the less cost route.

In embodiments, an optimal driving-only route is first calculated to the destination. Parking is found near the destination and the route is changed accordingly to the nearby parking. This assumes that the fastest route is to drive as close to the destination as possible where there is parking, then walk or take public transportation to the destination. With the added information of one or more of: parking availability, anticipated congestion during ingress or egress from parking space, a low safety rating, long walking distances, or excessive monetary cost, the algorithm may then choose to go farther afield from the destination. Any of the above factors (along with others) would act as multipliers to edge routing cost and would increase the total routing cost to the parking at the nearby structure.

The next step would be to look at parking a little farther afield from the destination but yet still be within walking or biking distance (if the user has a preference for biking set) from parking to the departure point of the public transportation and from the arrival point of the public transportation near the destination to the destination. If the total cost of parking plus walking or biking is still excessive, then the algorithm would look for parking or parking structures near public transportation that can be ridden to near the destination and that does not deviate much from the original calculated optimal route. The same weighting factors of safety, walking/biking distance, waiting time for public transportation, cost of public transportation, etc. also come into play with this step. If nothing is available near the optimal driving route, then the search would continue with more of a deviation from the optimal driving-only route. Also note that transportation costs and monetary costs will vary at various public transportation access points on the same line (bus or train, etc.).

Depending on the monetary threshold set by a user, the optimal route may be totally different. A monetary threshold can be described as how the user equates time and money. How much is every minute or hour of time saved during travel worth in dollars to the user? If time savings is worth a lot, then shortest duration routes are more heavily weighted. The monetary threshold does not have to be linear. The user might be willing to spend 10 more minutes to save 10 dollars, but they would not be willing to spend 100 dollars to save 100 minutes.

TABLE 2 and TABLE 3 provide a simplified example of the information associated with the edges and Nodes of FIG. 1.

TABLE 2

| Mode | Edge | Travel Time (minutes) | Distance (miles) | Cost (dollars) |
| --- | --- | --- | --- | --- |
| Vehicle | 104 | 15 | 6 | 2.00 |
| Vehicle | 108 | 12 | 4 | 1.50 |
| Vehicle | 112 | 8 | 2 | .75 |
| Walking | 122 | 10 | 0.2 | |
| Walking | 120 | 12 | 0.3 | |
| Walking | 118 | 3 | 0.05 | |
| Walking | 116 | 2 | 0.01 | |
| Bike | 124 | 45 | 3 | |
| Bike | 126 | 26 | 1.8 | |
| Train | 136 | 16 | 8 | 2.00 |
| Train | 130 | 12 | 4 | 1.25 |
| Train | 134 | 20 | 12 | 2.50 |

TABLE 3

| Node | Cost | Availability (no. of spaces) |
| --- | --- | --- |
| 106 | 24 | 20 |
| 110 | 36 | 6 |

Once again, in an embodiment, if a driver wants to travel from origin 102 in FIG. 1 to destination 114, then the first step is to calculate a driving route to the closest parking to the destination which would be 110.

However, the relative weighting that the user places on travel time versus monetary costs, versus safety must be factored in. In this example, safety is ignored. Let us assume that the user of the application wants to spend a maximum $40 to make the trip, but he/she is willing to take an additional minute for each $1 of savings. Further assume that this information has been entered into a data store and is available to the application.

From TABLES 1 and 2, it can be calculated what the travel time and cost associated with driving from node 102 via edges 104, 108 to parking structure 110, then walking edges 118 and 116. A travel cost for this route can be calculated in terms of time to traverse it by the summation of travel times for travel along all the edges. Likewise a monetary cost can be calculated by the summation of the cost of travel along the edges and the parking fee. Walking costs nothing. Therefore the travel time is 27 minutes for driving at a cost of $3.50 and a walking time of 22 minutes at no cost. Factoring in the cost of parking at node 110, the total travel time is 49 minutes and the cost is $39.50

The next step is to compare all other possible routes with these baseline numbers. All possible routes that are more expensive than $40 are ruled out. The travel time can be converted to dollars as the user has indicated that 1 minute is worth $1. Therefore the combined travel cost is 49 minutes×1 dollar per minute+$39.50 for a total of $88.50 in travel costs in equivalent dollars. Doing a similar calculation for all other routes and picking the lowest cost in equivalent dollars, would result in the optimal route.

Similar Weighting Could Be Done For Safety

The methods, systems, and devices discussed above are examples. An embodiment was described as processes depicted as a block diagram. Although this describes the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

In some embodiments, the method of this application is an integrated mapping and navigation application that runs on a mobile device (e.g., a smart phone, tablet computer, media player, etc.) and generates both (i) a user interface for display on the mobile device and (ii) a user interface for display on a screen of a vehicle to which the mobile device connects. Examples of a system that the method of this patent could be implemented on can be found, for example, in U.S. Pat. No. 9,857,193, incorporated herein by reference.

It has been noted that any one or more of the aspects and embodiments described herein may be conveniently implemented in and/or using one or more machines (e.g., one or more computers, one or more communications network devices, one or more electrical distribution network devices, any combination and/or network thereof, among other things) programmed according to the teachings of the present specification thus providing a special-purpose device in the form of a specialized navigation system. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by the navigation system functioning as a specialized computing device and that causes the navigation system so configured to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Figure 3:
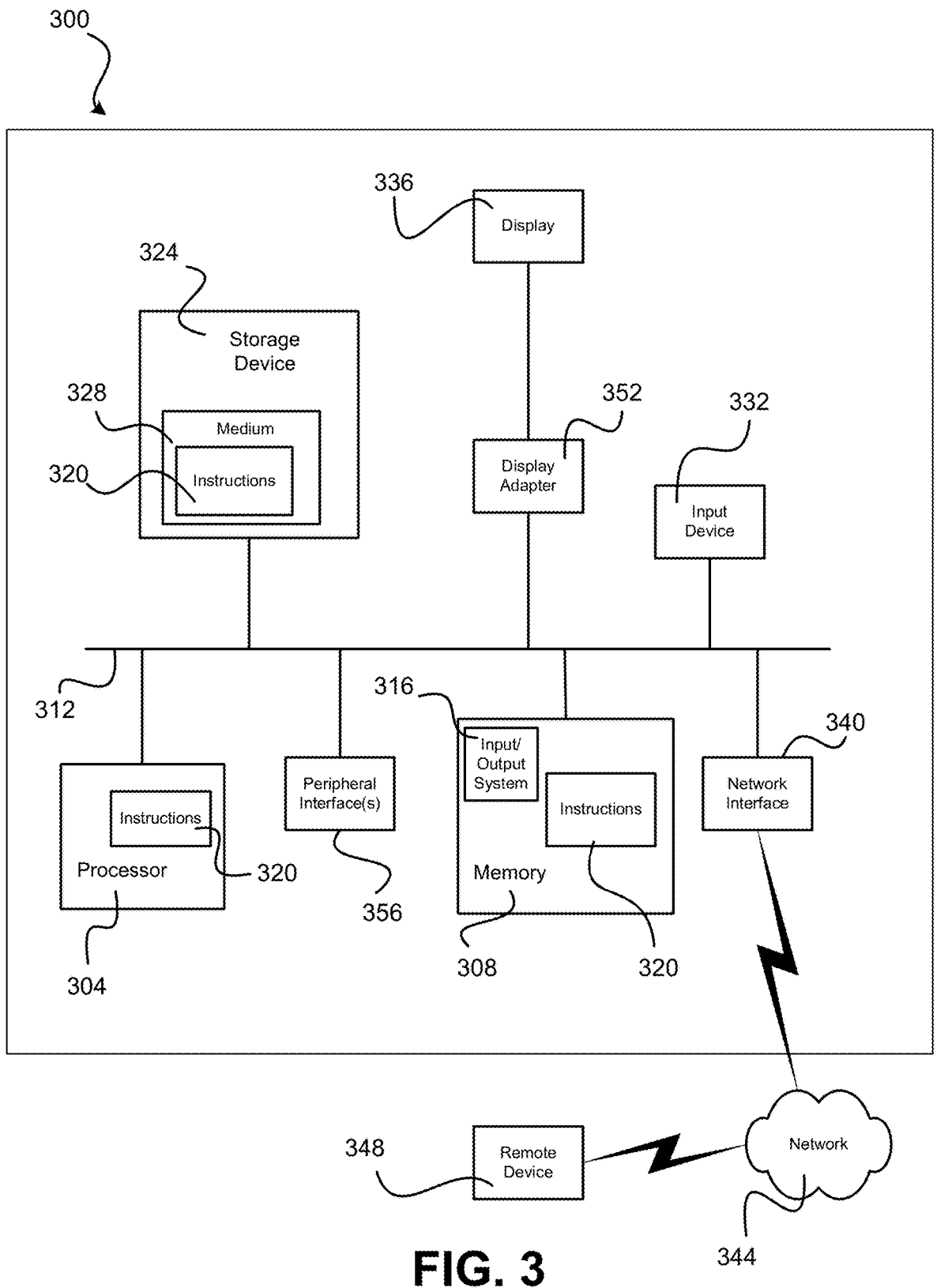
FIG. 3 is a schematic diagram of an exemplary embodiment of a hardware implementation of an embodiment of the present invention.

FIG. 3 shows a diagrammatic representation of one embodiment of a navigation system, i.e. navigation system 300, within which a set of instructions for performing any one or more of the aspects and/or methodologies of the present disclosure may be executed. It is also contemplated that multiple computing devices or processors may be utilized to implement a specially configured specialized machine in the form of a navigation system based on a set of instructions for causing one or more of the devices to contain and/or perform any one or more of the aspects and/or methodologies of the present disclosure. In this particular illustrative embodiment, navigation system 300 includes a processor 304 and a memory 308 that communicate with each other, and with other components, via a bus 312. Bus 312 may include any of several types of bus structures including, but not limited to, a memory bus, a memory controller, a peripheral bus, a local bus, and any combinations thereof, using any of a variety of bus architectures.

Memory 308 may include various components (e.g., machine-readable media) including, but not limited to, a random access memory component, a read only component, and any combinations thereof. In one example, a basic input/output system 316 (BIOS), including basic routines that help to transfer information between elements within navigation system 300, such as during start-up, may be stored in memory 308. Memory 308 may also include (e.g., stored on one or more machine-readable media) instructions (e.g., software) 320 embodying any one or more of the aspects and/or methodologies of the present disclosure. In another example, memory 308 may further include any number of program modules including, but not limited to, an operating system, one or more application programs, other program modules, program data, and any combinations thereof.

Navigation system 300 may also include a storage device 324. Examples of a storage device (e.g., storage device 324) include, but are not limited to, a hard disk drive, a magnetic disk drive, an optical disc drive in combination with an optical medium, a solid-state memory device, and any combinations thereof. Storage device 324 may be connected to bus 312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 324 (or one or more components thereof) may be removably interfaced with navigation system 300 (e.g., via an external port connector (not shown)). Particularly, storage device 324 and an associated machine-readable medium 328 may provide nonvolatile and/or volatile storage of machine-readable instructions, data structures, program modules, and/or other data for navigation system 300. In one example, software 320 may reside, completely or partially, within machine-readable medium 328. In another example, software 320 may reside, completely or partially, within processor 304.

Navigation system 300 may also include an input device 332. In one example, a user of navigation system 300 may enter commands and/or other information into navigation system 300 via input device 332. Examples of an input device 332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 332 may be interfaced to bus 312 via any of a variety of interfaces (not shown) including, but not limited to, a serial interface, a parallel interface, a game port, a USB interface, a FIREWIRE interface, a direct interface to bus 312, and any combinations thereof. Input device 332 may include a touch screen interface that may be a part of or separate from display 336, discussed further below. Input device 332 may be utilized as a user selection device for selecting one or more graphical representations in a graphical interface as described above.

A user may also input commands and/or other information to navigation system 300 via storage device 324 (e.g., a removable disk drive, a flash drive, etc.) and/or network interface device 340. A network interface device, such as network interface device 340, may be utilized for connecting navigation system 300 to one or more of a variety of networks, such as network 344, and one or more remote devices 348 connected thereto. Remote devices 348 may comprise user cell phones or data sources such as weather services or parking reporting services as explained above. Examples of a network interface device include, but are not limited to, a network interface card (e.g., a mobile network interface card), a modem, and any combination thereof. Examples of a network include, but are not limited to, a wide area network (e.g., the Internet, an enterprise network), a telephone network, a data network associated with a telephone/voice provider (e.g., a mobile communications provider data and/or voice network and combinations thereof. A network, such as network 344, generally will employ a wireless mode of communication so as to be compatible with the moving vehicle environment of vehicle navigation systems. In general, any network topology may be used. Information (e.g., data, software 320, etc.) may be communicated to and/or from navigation system 300 via network interface device 340.

Navigation system 300 may further include a video display adapter 352 for communicating a displayable image to a display device, such as display device 336. Examples of a display device include, but are not limited to, a liquid crystal display (LCD), a cathode ray tube (CRT), a plasma display, a light emitting diode (LED) display, and any combinations thereof. Display adapter 352 and display device 336 may be utilized in combination with processor 304 to provide graphical representations of aspects of the present disclosure. In addition to a display device, navigation system 300 may include one or more other peripheral output devices including, but not limited to, an audio speaker, a printer, and any combinations thereof. Such peripheral output devices may be connected to bus 312 via a peripheral interface 356. Examples of a peripheral interface include, but are not limited to, a serial port, a USB connection, a FIREWIRE connection, a parallel connection, and any combinations thereof.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for determining routing to a destination using a navigation system, wherein said routing employs one or more means of transportation with a first leg of the determined route being transportation by motor vehicle operated by the user and at least a second leg being by alternative means of transportation with an intermediate stop to park the motor vehicle at a parking location along the determined route, wherein one or more data stores accessible by the navigation system comprise information related to one or more of (i) travel times and tolls for vehicular traffic along road segments and intersections, (ii) mass transit information, (iii) parking information, (iv) pedestrian walkways, and (v) bike pathways, and wherein said navigation system comprises a processor and a memory containing an internal data store, the method comprising:

selecting and entering into the internal data store:
an origin for the route,
a destination for the route,
a time of day, and
user route preferences and relative weighting of travel costs, and
determining one or more routes to the destination which includes parking in-route, using a computer processor and based on information from the one or more data stores and the user input and preferences, wherein said determining comprises:
determining, using a route-finding algorithm executed on the processor, an initial route to the destination in compliance with saved user preferences;
identifying available parking at destination within set cost parameters and returning available parking meeting set cost parameters;
if no available parking at destination within cost parameters, then—
identifying secondary parking along the initial route within secondary cost parameters and returning said identified secondary parking, and
determining, using the route-finding algorithm executed on the processor, one or more routes from the identified secondary parking to the destination via the alternative transportation means and returning to the user alternative transportation routes to the destination meeting set cost parameters; and
if no available secondary parking along the initial route, then—
conducting a parking search to identify available tertiary parking locations meeting corresponding cost parameters; and
determining, using the route-finding algorithm executed on the processor, alternative motor vehicle routes to identified tertiary parking locations and routes to the destination from the identified tertiary parking locations via alternative transportation means and returning to the user alternative motor vehicle routes and alternative transportation routes meeting set cost parameters.

2. The method of claim 1, further comprising presenting the determined routes for selection by the user on a graphical user interface (GUI).

3. The method of claim 1, wherein:
the motor vehicle has a vehicle type corresponding one of a personal car, handicap vehicle, high clearance vehicle, emergency vehicle, RV, motorcycle, delivery truck, vehicle with a trailer, heavy vehicle, compact vehicle, electric vehicle, carpool vehicle, or a commercial vehicle for hire which has parking requirements near the destination;
the one or more data stores has specific routing and parking information for plural of said motor vehicle types; and
user route preferences include the type of motor vehicle being driven.

4. The method of claim 1, where the user route preferences further comprise:
a maximum monetary cost,
a weighting factor for the importance of speed of travel and monetary cost of travel,
acceptable alternative means of transportation, including but not limited to one or more of a bus, bicycle (or citibike and maximum distance to pedal), walking (and maximum distance to walk), wheelchair, train, ferry, aerial tram, helicopter, and taxi (or other taxi-like service), and the datastore has information specific to the selected user route preferences.

5. The method of claim 4, wherein safety of areas corresponding acceptable alternative means of transportation are part of the data store and the user can select a threshold for one or more of the levels of safety for a selected alternative means of transportation, and the level of safety for the parking location.

6. The method of claim 1, wherein availability of parking is part of the parking information along with the probability of the parking being available when the user needs it and wherein a user can select a probability threshold that parking will be available.

7. The method of claim 1, wherein weather parameters for any of driving or cycling or walking are part of the data store and queried in real-time, and wherein a user can specify a weather threshold for driving, cycling, or walking.

8. The method of claim 1, wherein user route preferences include indication of the driver bringing a bike with the motor vehicle, and cost of travel parameters require any subsequent alternative means of transportation be the bike or able to also transport the bike.

9. A navigation system, comprising:
one or more computer processors configured to calculate at least one multimodal route from an origin to a destination, with travel along the route originating in a motor vehicle that is subsequently parked at some point prior to arrival at the destination,
one or more data stores in communication with the one or more processors, the one or more data stores containing transportation network information including one or more of—
    road segments and connecting nodes including geography and connectivity to other segments, and one or more of allowed maneuvers, travel time, safety index,
    pedestrian segments including geography and connectivity to other segments, and one or more of allowed maneuvers, travel time, safety index,
    bicycle segments including geography, and one or more of allowed maneuvers, travel time, safety index,
    public transportation segments and nodes including geometry and one or more of schedules, seat availability, and safety index, and
    parking spaces including location, and optionally availability, and a safety index;
a transportation cost model executable by said processors to determine a relative travel cost for a calculated route based on transportation network information received from the one or more data stores and user preferences;
memory in communication with said one or more processors, said memory containing routing instructions configured for execution by said processors, said routing instructions comprising instructions that cause the processors to—
    determine, using a route-finding algorithm executed on the processor, an initial route to the destination in compliance with saved user preferences;
    identify available parking at destination within set cost parameters and returning available parking meeting set cost parameters;
    if no available parking at destination within cost parameters, then—
        identify secondary parking along the initial route within secondary cost parameters and returning said identified secondary parking, and
        identify, using the route-finding algorithm executed on the processor, one or more routes from the identified secondary parking to the destination via the alternative transportation means and returning to the user alternative transportation routes to the destination meeting set cost parameters; and
    if no available secondary parking along the initial route, then—
        conduct a parking search to identify available tertiary parking locations meeting corresponding cost parameters; and
        determine, using the route-finding algorithm executed on the processor, alternative motor vehicle routes to identified tertiary parking locations and routes to the destination from the identified tertiary parking locations via alternative transportation means and returning to the user alternative motor vehicle routes and alternative transportation routes meeting set cost parameters; and
a user interface in communication with said one or more processors wherein a user enters user preference, origin and destination information used by the one or more computer processors in determining multimodal routing.

10. The system of claim 9, wherein:
the data store contains—
    information specific to additional user route preferences including a maximum monetary cost, the importance of speed of travel and monetary cost of travel, and acceptable alternative means of transportation, including at least two of a bus, bicycle, walking, wheelchair, train, ferry, aerial tram, helicopter, and taxi service, and
    cost weighting for safety of areas corresponding acceptable alternative means of transportation; and
said memory contains additional routing instructions configured for execution by said processors to permit user selection of a threshold for one or more levels of safety for a selected alternative means of transportation, and the parking location.

11. The system of claim 10, wherein said route-finding algorithm comprises a Dijkstra algorithm.

12. The system of claim 10, wherein said route-finding algorithm comprises an A* algorithm.

13. The method of claim 1, wherein:
the mass transit information includes information on mass transit schedules, monetary cost, and transportation costs,
the parking information includes information on parking availability, location and monetary cost,
the pedestrian walkways information includes information on walkway routes and walking times, and
the bike pathways information includes information on bike pathway routes and travel times.

* * * * *